United States Patent Office 2,943,945
Patented July 5, 1960

2,943,945

CORROSION PREVENTION

Lawrence G. Saywell, San Francisco, Calif., assignor to Eureka Chemical Company, a corporation of California No Drawing. Filed May 13, 1959, Ser. No. 812,792

6 Claims. (Cl. 106—14)

This application is a continuation-in-part of my application Serial No. 574,597, filed March 29, 1956, now abandoned.

This invention relates to a corrosion prevention agent and to the method of making the same. More specifically, the invention is directed to forming a protective agent which comprises a water-in-oil dispersion which forms a tenacious bond on metal surfaces, which prevents the corrosion of the metal surfaces and which serves to remove and sequester rust and corrosion already present on the metal surface to which it is applied. As will be apparent later, the dispersion may be preformed and placed on the surface to be protected, or substantially anhydrous material may be placed on the surface and the dispersion formed in situ upon contact with water.

In my previous application referred to above, I described one part, two part and pre-gelled corrosion control compositions. I have now found that by making certain modifications in my process that improved compositions having greater gel strength and higher dropping points may be produced. Further, I have found that the materials can be pigmented to make them more attractive in appearance. Further, I have found that fungicides may be incorporated in the product whereby the material is useful in protecting both wood and metal surfaces in contact with each other.

One particular advantage of the compositions of the present invention is that no pre-treatment of the surfaces is required and the normal cost of sand blasting or similar operations is avoided. Thus, the material may be used to protect old or new surfaces.

It has heretofore been proposed to protect tanks and the like, which are periodically subjected to water and particularly sea water, by floating a film of oil or similar material on the surface of the water so that as water rises in the tank, the oil will be deposited on the walls, and as water is withdrawn from the tank, the oily material will fall from the walls and float on the water. Such methods of protection suffer from the obvious defect that, unless extreme care is used, the protective material will be lost as the tank is pumped out or filled. Further, such methods are not fully effective to prevent corrosion. In direct contrast to such previously proposed methods, the material of the present invention forms a tenacious gel structure on the wall being protected and remains in place even if water is periodically pumped into and out of the tank. Thus, the product of the present invention is suitable for use in protecting metal surfaces which may or may not be subjected to periodic contact with water. Specifically, the invention is suitable for use in wet or dry tanks, chain lockers, double bottoms, cofferdams, pontoons, voids, shaft housings, rudder hubs, or wherever the presence of a moist film is suitable. Other applications are to treat metal reinforcing rods imbedded in concrete and to saturate felt which is to be used as a pipe wrapping. The composition of the present invention is not suitable for use in tanks which are used for oil or oily materials.

In general, the objects of the present invention are achieved by providing an oily material which contains a soap of a divalent metal, and preferably calcium soaps of wool fat acids, together with pine oil, a water-in-oil type detergent, and an amine type inhibitor. Calcium and other water insoluble soaps of stearic acid can be combined with the wool fat soaps. In accordance with the present invention, various compositions may be used, some of which are anhydrous and some of which contain water. The substantially anhydrous compositions may be applied in any way such as by painting, spraying, or brushing the material on the wall to be treated, or by placing the material in a tank and subsequently flooding the tank with water, whereupon the material will be deposited on the walls. The materials which contain water are of a gel nature and these materials are applied by spraying or brushing the gel directly onto the wall.

As the oil component of my composition, various petroleum oils are suitable. Preferably, the oil is one which is not readily volatile so that diesel fuel oil, lubricating oil or bunker fuel oil can be used. Mixtures of various grades of oil are often advantageous.

If the material is to be pigmented, any of the usual pigments which are compatible with oil base paints can be used. Thus, carbon black, chromic oxide, titanium dioxide, ferric oxide, chrome yellow, aluminum powder (flake), mica and asbestos fibers, as well as other pigments, can be used. Ordinarily, such pigments will be used in a quantity of about one pound per gallon, although this quantity can be suitably adjusted for particular conditions.

Various fungicides such as pentachlorophenol, phenyl mercuric acetate and copper naphthenate can be incorporated in the product.

In the examples which follow, Carbitol (diethylene glycol monoethyl ether) is used as a coupling agent. It will be understood that other alcohol-ether coupling agents such as ethylene glycol monoethyl ether, butyl glycol monoethyl ether and the like can be used.

The material may be applied as a two-part material or as a single part material. In other words, some applicators require that the material be in two parts so that the first is first applied to a metal surface, the emulsion formed, and subsequently the second part is added which tends to plasticize the gel. It is also possible to combine all of the materials and apply the material at one time, or the first part material may be used alone.

The following non-limiting examples illustrate various preferred embodiments of the present invention.

*Example 1.*—About 1,000 pounds of wool fat (commercial degras) is placed in a kettle equipped with a heater and stirrer and warmed to about 140° F. There is then added to the warm fat one and one-half gallons of Carbitol (diethylene glycol monoethylether), and about one quart of a water-in-oil type, oil soluble, non-ionic detergent. Oronite NI-O and Tergitol NP14 are suitable. Both are condensation products of ethylene oxide and alkyl phenols. A slurry is separately prepared consisting of about 65 to 75 pounds of calcium hydroxide in 60 gallons of diesel oil. The slurry is made by adding calcium hydroxide to diesel oil and after the calcium hydroxide is completely wet with diesel oil, about 2½ gallons of water are added to the slurry. The slurry is slowly added with mixing and heat is continually applied to the kettle, and this, coupled with the fact that the reaction is exothermic, raises the temperature slowly to about 165° F. After the slurry is completely added, 60 gallons of hot diesel oil (preheated to about 160–190° F.) are then slowly added to the kettle, the kettle temperature is raised to a temperature of from 185° to 198° F. and is held at this temperature for about six or seven hours or even longer. At the end of this time, 200 pounds of pine oil are added to the mixture, and from 50 to 80 pounds of bunker C fuel oil. 140 gallons of diesel oil, which has been preheated as before, are then slowly added and the temperature of the vessel is maintained for one hour. At this time, there are added four pounds of an amine type corrosion inhibitor and two and one-half gallons of dichloropentane. Heating is preferably continued for an hour or so additional. As the amine type corrosion inhibitor, one may use Duomeen T dioleate, a salt of a fatty diamine and oleic acid. The mixture is then cooled and placed in airtight drums. The material is a thin liquid containing from 0.1 to 0.3% water. The material thus made may be used for corrosion prevention as it is, it may be mixed with the part 2 material described in Example 2, it may be used as the first part of a two-part application (in all of which cases a gel is formed in situ by contact with water), or it may be used to form a gel, as in Examples 4 and 5.

Example 2.—A blend is made of the following ingredients:

| | Pounds |
|---|---|
| Diesel oil | 300 |
| Cresylic acid | 110 |
| Amine type corrosion inhibitor | 0.5 |
| Carbitol | 33 |
| Oil soluble, non-ionic detergent | 9 |
| Pine oil | 6 |
| Oil soluble petroleum sulfonate | 42 |

Example 3.—In some applications, a one-part material of an anhydrous nature is used. Although the material of Example 1 may be used as such, it is preferable to blend four parts of the No. 1 material with one part of the No. 2 material for such applications.

Example 4—Pre-gelled material.—A mixture is made containing eight pounds of the oil soluble, non-ionic detergent, 30 pounds Carbitol, 5 pounds of the amine type corrosion inhibitor, 40 pounds cresylic acid, and 60 gallons of diesel oil. This mixture is added to about 600 gallons of the material made in accordance with Example 1, and after thorough mixing, there is slowly added about 30 to 32 gallons of water. This forms a thixotropic gel, which may be put in drums, and which tends to thicken in the drum. However, it may be readily pumped out using a conventional high pressure flow-on nozzle and applied to metal surfaces.

Example 5—Pre-gelled material.—The material of Example 1 is mixed with water in the proportion of 600 gallons of the material of Example 1 with 26 to 30 gallons of water. A gel is formed similar to the gel of Example 4.

A sufficient amount of material is used so that a film thickness of from 1/16" to 1/4" in thickness is produced on the metal being protected. Normally, a film between 1/8" and 3/16" is found suitable. The material of Examples 1 through 3 can be applied to metal surfaces by brushing, spraying, or flotation, while the material of Example 4 is applied by brushing, spraying or similar methods. The material of Example 2 is applied to a surface previously treated with one of the other described agents and tends to plasticize and strengthen the gel.

Example 6.—About 1000 pounds of wool fat (low acid grade) is heated to a temperature of from 170–175° F. To this is added one quart of an oil soluble non-ionic detergent as in Example 1 and 1½ gallons of Carbitol. In a separate vessel a slurry is made of 100 gallons of petroleum oil, 67 pounds of calcium hydroxide and 3 gallons of water. The slurry is then added to the hot wool fat mixture with constant stirring over a period of at least one hour. Stirring is continued and 20 gallons of petroleum oil is added to the mixture. The temperature is then raised to 190–192° F. and is held at this temperature for at least five hours. During this time, stirring is employed at least once every five minutes. A mixture is now prepared in a separate vessel of 8 pounds of a non-ionic detergent as defined above, 30 pounds of Carbitol, 14 pounds of an amine type corrosion inhibitor as in Example 1 and 35 pounds of cresylic acid. This mixture is then added with stirring to the main batch and at the end of this addition, about 29 gallons of hot water is added to the batch and the batch is held with stirring at the temperature of 192–195° F. for at least 30 minutes. Now there is added to the mixture 42 pounds of pine oil, 170 gallons of petroleum oil and 6 pounds of the diamine corrosion inhibitor and the mixture is again held at 190–192° F. for a period of thirty minutes with stirring. A separate slurry is now prepared of 3½ pounds of calcium hydroxide, and 3 gallons of petroleum oil and this slurry is added to the mixture and stirring is continued at a temperature of 190–192° F. for at least 30 minutes. Now, 120 pounds of stearic acid is added to the mixture and stirring is continued for another 20 minutes. At the end of this time, there is added slowly 230 gallons of hot petroleum oil and the mixture is held at the same temperature for 20 minutes. The mixture is then cooled somewhat and 110 gallons of petroleum oil is added to the mixture. At this point, the mixture may be put in drums for storage and shipment. However, if a pigment or a fungicide is to be added, it is stirred into the mixture before drumming.

I claim:
1. The method of making a corrosion control composition comprising heating about 1,000 pounds of wool fat to a temperature of about 140° F., adding thereto about 1½ gallons of diethylene glycol monoethyl ether and about 1 quart of an oil soluble non-ionic type detergent, adding to said mixture a slurry containing about 65 to 75 pounds of calcium hydroxide, about 60 gallons of diesel oil, and 2½ gallons of water, raising the temperature to about 165° F., adding about 60 gallons of diesel oil, heating the mixture to a temperature of about 185° to 198° F. for several hours, thereupon adding 200 pounds of pine oil, about 50 to 80 pounds of heavy fuel oil and about 140 gallons of diesel oil, maintaining said temperature for about an additional hour, adding about 4 pounds of an amine type corrosion inhibitor and 2½ gallons of dichloropentane and cooling the mixture.

2. The method of making a corrosion control composition comprising mixing about four parts of the material set forth in claim 1 with one part of a mixture containing the following:

| | Parts |
|---|---|
| Diesel fuel | 300 |
| Cresylic acid | 110 |
| Amine type corrosion inhibitor | 0.5 |
| Carbitol | 33 |
| Non-ionic oil soluble detergent | 9 |
| Oil soluble petroleum sulfonate | 42 |
| Pine oil | 6 |

3. A composition of matter containing the following:

| | Parts |
|---|---|
| Diesel fuel | 300 |
| Cresylic acid | 110 |
| Amine type corrosion inhibitor | 0.5 |
| Carbitol | 33 |
| Non-ionic oil soluble detergent | 9 |
| Oil soluble petroleum sulfonate | 42 |
| Pine oil | 6 |

4. The method of forming a pre-gelled corrosion control composition comprising mixing together 8 pounds of an oil soluble non-ionic detergent, 30 pounds Carbitol, 5 pounds of an amine type corrosion inhibitor, 40 pounds cresylic acid and 60 gallons of diesel oil, adding said mixture to about 600 gallons of the mixture prepared in accordance with claim 1, thoroughly mixing said materials, and then adding from 30 to 32 gallons of water to said mixture whereby a gel is formed.

5. The method of making a pre-gelled corrosion control composition comprising heating 1,000 pounds of wool fat to a temperature of from 170–175° F., adding thereto about one quart of a non-ionic detergent and about 1½ gallons of an ether-alcohol coupling agent, adding to the mixture thus produced a slurry containing about 100 gallons of a petroleum oil, about 67 pounds of calcium hydroxide and 3 gallons of water, stirring said slurry into said mixture over a one hour period, adding to said mixture about 20 additional gallons of petroleum oil, raising the temperature of said mixture to 190–192° F. and holding said mixture at said temperature for about five hours with at least intermittent stirring, adding to said mixture about 8 pounds of a non-ionic detergent, about 30 pounds of a coupling agent as defined above, about 14 pounds of an amine type corrosion inhibitor and about 35 pounds of cresylic acid, adding 29 gallons of hot water to said mixture and holding the mixture at a temperature of 192–195° F. for 30 minutes, adding to said mixture about 42 pounds of pine oil, about 170 gallons of petroleum oil, about 6 pounds of an amine type corrosion inhibitor as defined above, holding said mixture at a temperature of 190–192° F. for at least 30 minutes while stirring, adding to said mixture a slurry containing about 3½ pounds of calcium hydroxide and 3 gallons of petroleum oil, stirring said mixture for about 30 minutes at 190–192° F., adding to said mixture about 120 pounds of stearic acid and holding said mixture for about 20 minutes, adding to said mixture about 230 gallons of oil and holding for 20 minutes and cooling said mixture.

6. The process of claim 5 wherein a pigment is added at the end of the cooling period, said pigment being added in a quantity of approximately one pound per gallon.

References Cited in the file of this patent

UNITED STATES PATENTS

| | | |
|---|---|---|
| 1,982,662 | Hodson | Dec. 4, 1934 |
| 2,223,766 | Lincoln et al. | Dec. 3, 1940 |
| 2,361,391 | Fraser et al. | Oct. 31, 1944 |
| 2,398,075 | Brunstrum | Apr. 9, 1946 |
| 2,487,081 | Swenson | Nov. 8, 1949 |
| 2,673,818 | Woog | Mar. 30, 1954 |
| 2,758,981 | Cooke et al. | Aug. 14, 1956 |
| 2,796,353 | Dieman | June 18, 1957 |

FOREIGN PATENTS

| | | |
|---|---|---|
| 612,510 | Great Britain | Nov. 15, 1948 |